United States Patent [19]

Yamazaki

[11] Patent Number: 4,920,435
[45] Date of Patent: Apr. 24, 1990

[54] MAGNETIC RECORDING AND REPRODUCING DEVICE WITH IMPROVED TRACK SERVO

[75] Inventor: Shohei Yamazaki, Hamamatsu, Japan

[73] Assignee: Yamaha Corporation, Hamamatsu, Japan

[21] Appl. No.: 147,448

[22] Filed: Jan. 25, 1988

[30] Foreign Application Priority Data

Jan. 27, 1987 [JP] Japan .................................. 62-16385

[51] Int. Cl.$^5$ ............................ G11B 5/52; G11B 5/58
[52] U.S. Cl. .................................. 360/77.15; 360/18; 360/32; 360/70
[58] Field of Search ........ 360/18, 27, 32, 73.04–73.14, 360/77.12–77.17, 70, 75

[56] References Cited

U.S. PATENT DOCUMENTS

4,739,420 4/1988 Odaka et al. ........................... 360/18
4,755,893 7/1988 Yamada et al. ....................... 360/18

Primary Examiner—Aristotelis M. Psitos
Assistant Examiner—Steven R. Garland
Attorney, Agent, or Firm—Spensley Horn Jubas & Lubitz

[57] ABSTRACT

A magnetic recording and reproducing device with an automatic tracking control function which can record and reproduce signals by means of a rotary head incorporating plural heads of different azimuth. The device performs tracking control by detecting, based on a timing of a synchronizing signal of a track, crosstalks of pilot signals obtained from adjacent tracks and comparing the crosstalks to use the difference as a tracking error signal. A form of the synchronizing signal is different alternately in a series of tracks of the same azimuth. The device comprises a designation element and a detection element for the synchronizing signal form. A designated form of the synchronizing signal is inverted each time a head has scanned two tracks and, if a designated form and a detected form of the synchronizing signal coincides with each other, a tracking error is detected and a tracking control is implemented whereas, if the designated form and the detected form of the synchronizing signal do not coincide with each other, the designation is changed without implementing the tracking control so that the designated form and the detected form are immediately brought into coincidence whereby the tracking control can be immediately applied.

8 Claims, 9 Drawing Sheets

MAGNETIC RECORDING AND REPRODUCING DEVICE WITH IMPROVED TRACK SERVO

BACKGROUND OF THE INVENTION

This invention relates to a magnetic recording and reproducing device and, more particularly, to saving of time required for entering the tracking of heads into tracking servo control during reproduction of a recorded signal in a magntic recording and reproducing device such as an R-DAT (rotary head type digital audio tape recorder).

The R-DAT is a device which converts analog signals such as an audio signal into PCM signals, records the PCM signals on a magnetic tape and reproduces the same.

Figure 2:
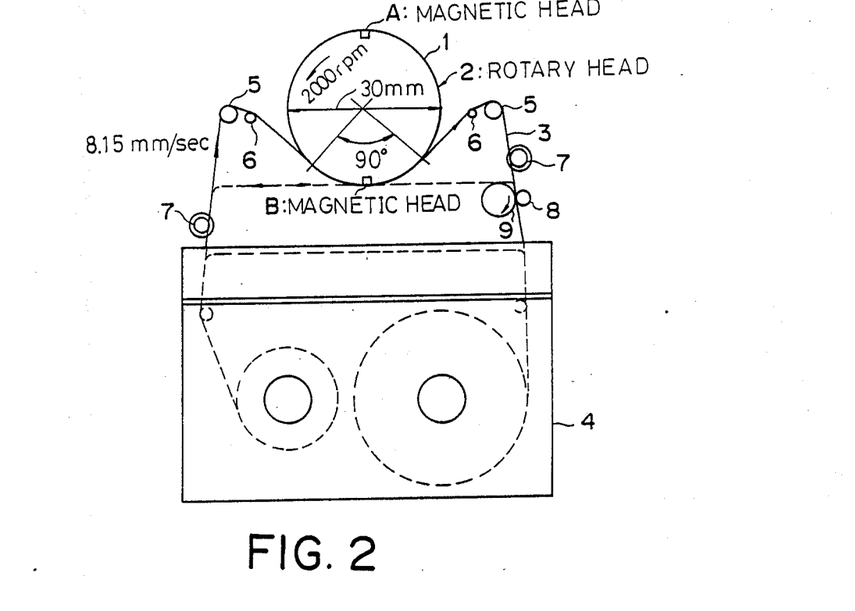
FIG. 2 is a view showing the mechanism of the R-DAT.

As shown in FIG. 2, the device comprises a rotary head 2 having two magnetic heads A and B separated by 180 degree interval on the circumferential surface of a cylinder 1. A tape 3 is loaded from a casette housing 4 with a vertical post 5 or with an inclined post 6, wound on the circumferential surface of the rotary head 2 for 90 degrees, supported by a fixed guide 7, and run by a capstan 8 and a pinch roller 9.

The diameter of the rotary head 2 is 30 mm, and the winding angle for the tape is 90 degrees. For recording and reproduction, at the mode I which is usually used, the rate of the rotary head 2 is 2,000 rpm (circumferential speed: 3.14 m/sec) and the speed of the tape 3 at 8.15 mm/sec in the direction identical to that of the rotary head 2. The relative speed of the head 2 as against the tape 3 is 3. 13 m/sec.

Figure 3:
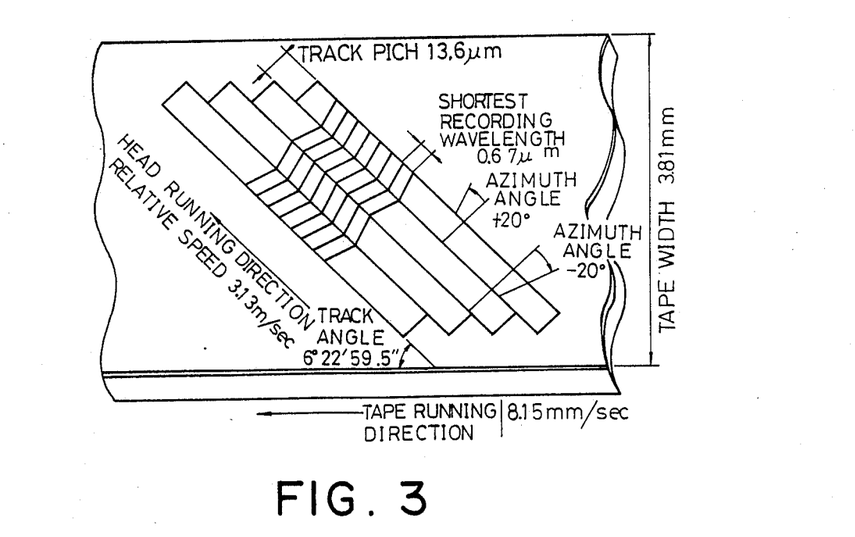
FIG. 3 is a tape format used for the R-DAT.

The recording system with R-DAT is a helical scanning azimuth recording. Its tape format as shown in FIG. 3 defines with the track angle of 6° 22' 59.5" and azimuth angle of ±20° with the tracks alternately traced by two heads A and B.

Figure 4:
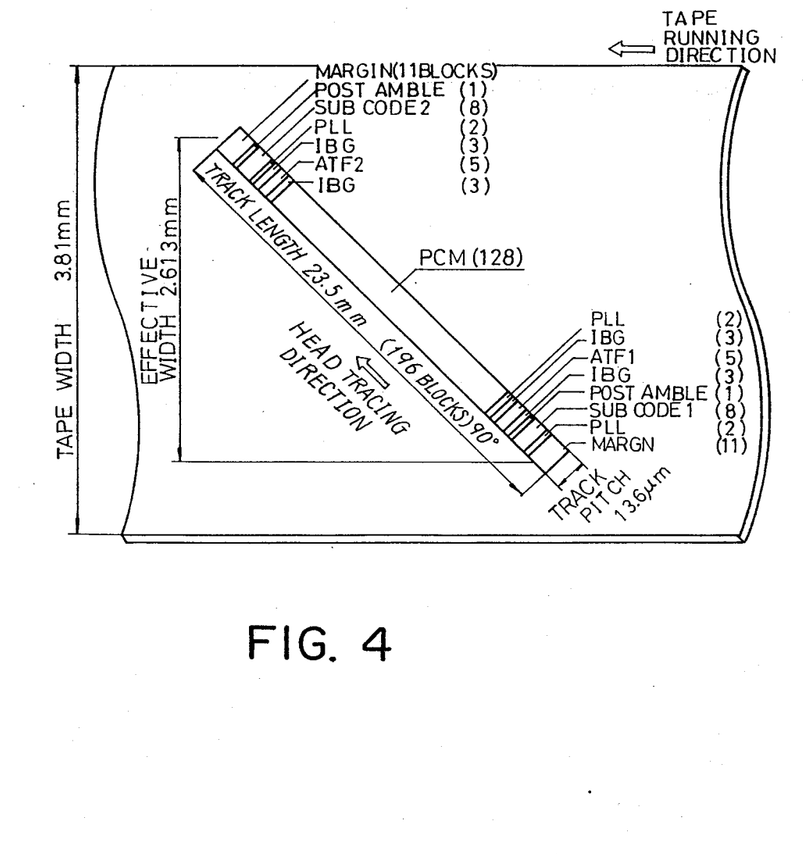
FIG. 4 is a track format of the R-DAT.

FIG. 4 shows a track format wherein audio data are recorded at the center of a PCM region, and sub-codes and control signals such as ATF (automantic track finding) are recorded on both sides thereof.

Figure 5:
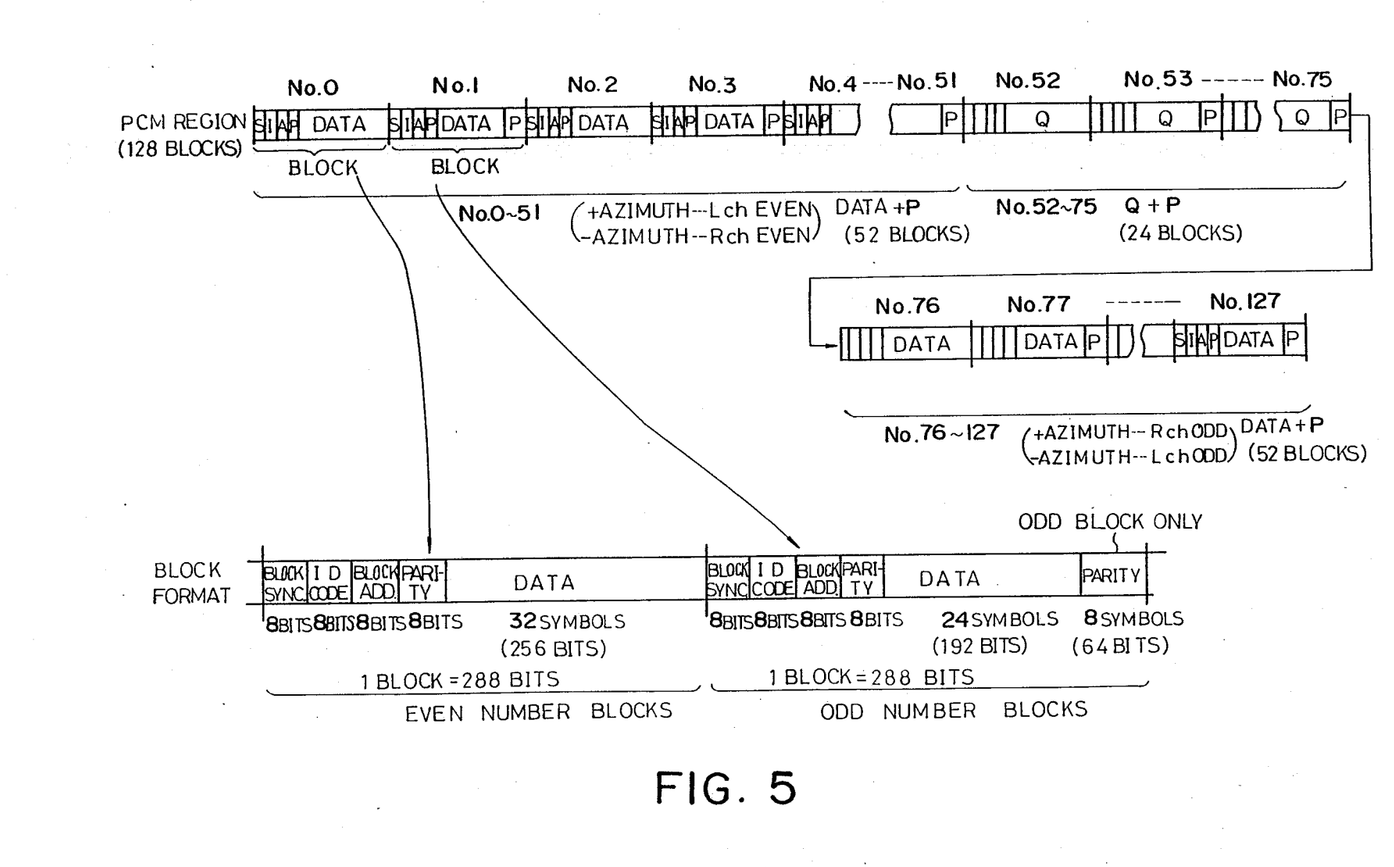
FIG. 5 is a format of PCM region shown in FIG. 4.

The PCM region comprises 128 blocks as shown in FIG. 5 each of which has recording regions for a block synchronizing (indicating the starting position of the block), ID (identification) code, block address, parity check code, and audio data. At the mode I, audio data uses 2's complement codes of quantization bit of 16 bits of the sampling frequency of 48 kHz, and the PCM data is divided into 8 bits in higher order and 8 bits of lower order, modulated from 8 bits into 10 bits (8–10 modulation) and recorded in 10 bits.

For tracking control during reproducing in the R-DAT, an automatic tracking system with ATF is employed. ATF system detects and compares crosstalks from two adjacent tracks by ATF signals recorded on the tracks, and controls the speed of the capstan motor for running tape so as to make crosstalks identical.

The principle of ATF will now be described below.

Figure 6:
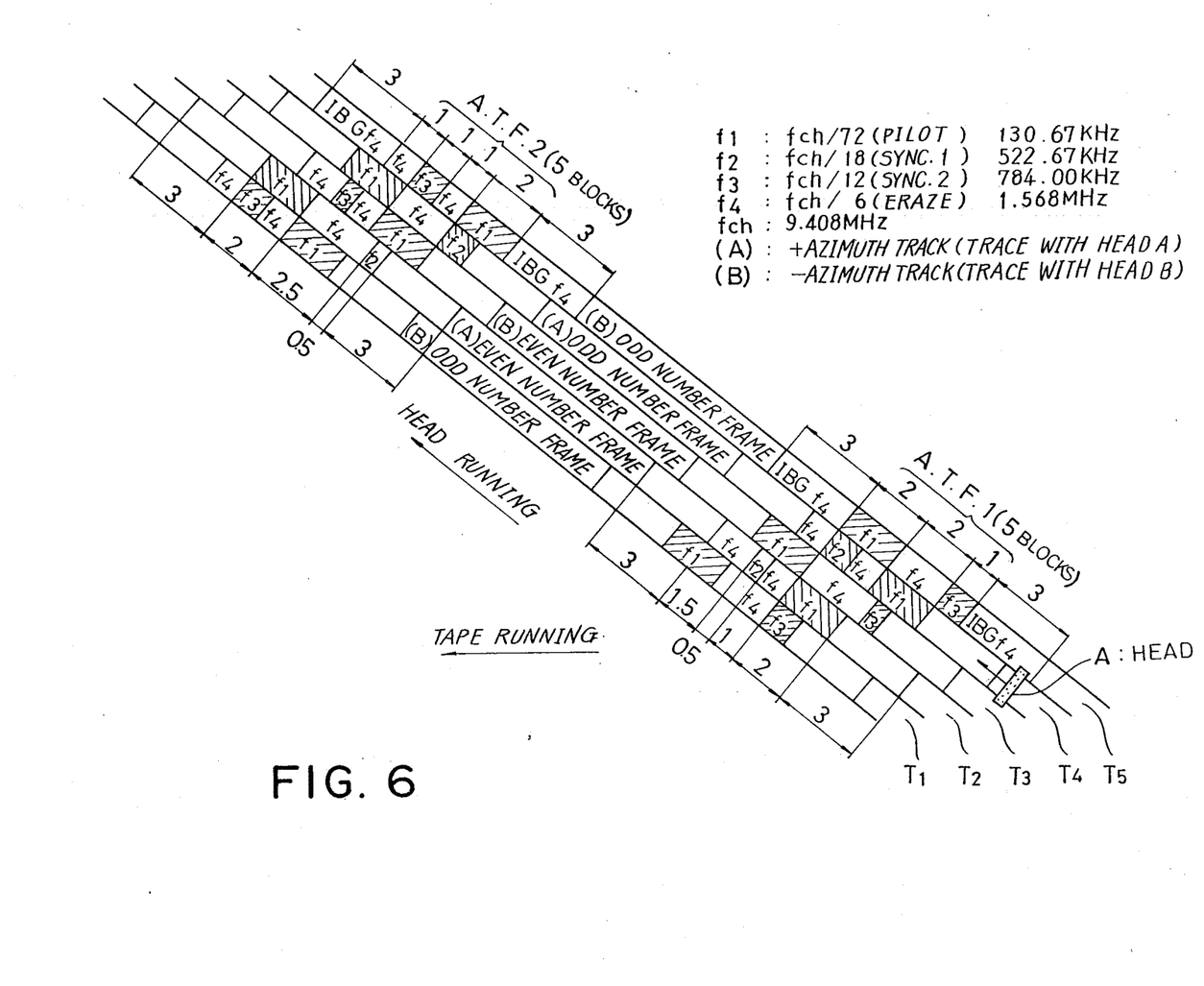
FIG. 6 is a format of ATF1 and ATF2 of FIG. 4.

ATF signals are recorded at two locations on one track, i.e., ATF1 and AFT2, as shown in FIG. 4. As shown in the format in FIG. 6, pilot signal f1 and synchronizing signal f2 (or f3) are recorded on each track. The frequencies are specified respectively;

f1 = 130.67 kHz
f2 = 522.67 kHz
f3 = 784.00 kHz

The frequency of f1 is low enough not to have much azimuth loss. The head A traces the track (hereinafter referred to as A track) of the synchronizing signals of f2. The head B traces the track (hereinafter referred to as B track) of the synchronizing signals of f3. The track length of a synchronizing signal differs between an odd number frame and an even number frame, which are defined as one (1) block and 0.5 block respectively.

If it is assumed that the head A is tracing the A track T4, pilot signals f1 of adjacent tracks T3 and T5 are obtained from the head A due to crosstalks in addition to a reproduced signal from the A track T4. This is because the head has a width 1.5 times as large as a track. If the head A is tracing the A track T4 correctly, crosstalks from the B tracks T3 and T5 become equal, but if the head is deviated to either direction, the crosstalks from them become different from each other. The crosstalks from the adjacent B tracks T5 and T3 are detected by detecting amplitude levels of the pilot signal f1 on the B track T5 and of the pilot signal f1 of the track T3 at the detection timing of the synchronizing signal f2 of the track T4. The difference in the crosstalks therefore is presumed to represent tracking errors.

Figure 7:
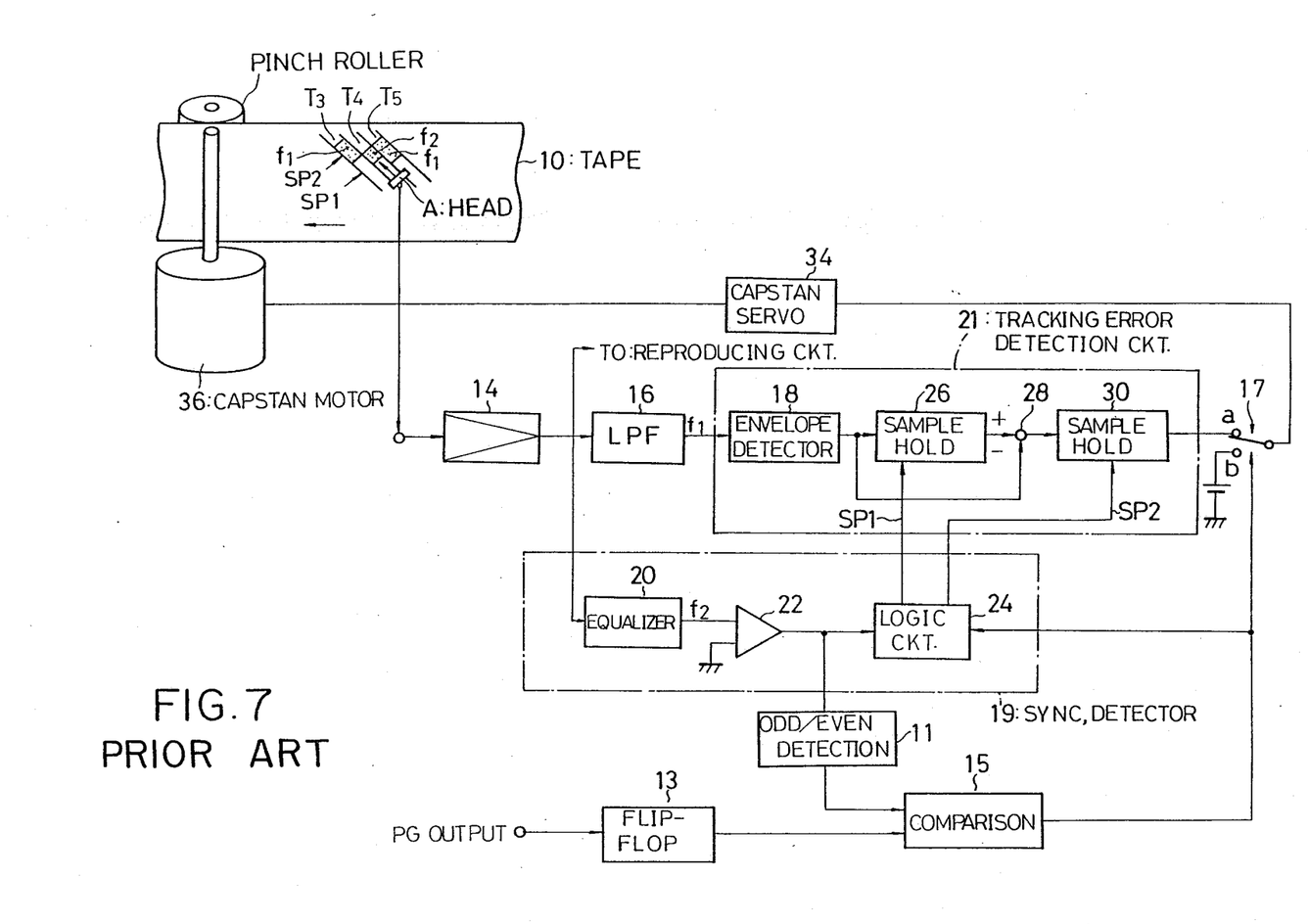
FIG. 7 is a block diagram showing an example of the prior art ATF device in an R-DAT.

FIG. 7 shows a prior art ATF device based on the above mentioned principle. A reproduced signal from the head A is applied to a low-pass filter 16 via a reproduction amplifier 14 to extract pilot signal f1. The extracted pilot signal f1 is applied to a tracking error detection circuit 21, detected in envelope by an envelope detection circuit 18, and applied to a sample hold circuit 26. A synchronizing signal detector 19 detects synchronizing signal f2 with an equalizer 20 and a comparator 22, and the comparator 22 outptus "1" during the period when the synchronzing signal is being detected.

A logic circuit 24 outputs sample hold signals SP1 and SP2 at the timing of the detected synchronizing signal f2. As the sample hold signal SP1 is provided at a timing immediately after the start of detection of the synchronizing signal f2, if the output from the circuit 18 is sampled with the SP1, a sample hold circuit 26 can hold crosstalk amplitude level of the pilot signal f1 on the B track T5 which is the track next to the A track T4 currently being traced. A subtractor 28 implements subtraction between the output of the sample hold circuit 26 and the output of the detector 18. A sample hold signal SP2 is produced after the time equivalent to 2 blocks after the start of detection of the synchronizing signals f2 (timing substantially at the center of the pilot signal f1 on the B track T3). By sample holding the output from the subtractor 28 with this signal SP2, difference in crosstalk amplitude levels between the pilot signals f1 of the track T3 and of the track T5 positioned on both sides of the track T4 which is currently being traced is sample held at the circuit 30.

The output from the circuit 30 is applied to a capstan servo circuit 34 as a tracking error signal. The circuit 34 controls the speed of the capstan motor 36 in such a manner that the tracking error becomes zero. This eventually controls the running speed of the tape 10 thereby correcting the tracking error.

In the ATF device shown in FIG. 7, when the head A is deviated to the left from the center, crosstalks of the pilot signal from the B track T3 increases. A negative signal is therefore held at the sample hold circuit 30. In order to correct this, the capstan motor 36 increases the speed.

When the head A is deviated to the right, the crosstalk of the pilot signal from the B track T5 increases, and a positive singal is held at the circuit 30. For correcting this, the speed of the capstan motor 36 is decreased. Accordingly, if tracing of the head A is substantially correct as shown by I in FIG. 8, tracking control is made so that the tracking will be made over the A track as shown by arrows a, a.

Similarly in the head B, crosstalk signals of left and right adjacent tracks are detected on the basis of the detection timing of the synchronizing signal f3 of the B track and the speed of the capstan motor 36 is controlled so as to reduce the difference between the two crosstalk signals to zero.

As described above, in the R-DAT, the tracking control is carried out by differring the frequencies of the synchronizing signals of ATF from each other, namely f2 for the A track and f3 for the B track, so as to cause the head A to trace the A track and the head B to trace the B track.

Such tracking control depending simply upon difference in the frequencies of synchronizing signals however poses a problem. That is, if the head trace has been deviated by about one track between the start and end of reproduction as shown by II in FIG. 8, the head A detects the synchronizing signal f2 in different A tracks at positions ATF1 and ATF2. The tracking control in this case would be made in such a manner that the head A is driven in opposite directions at the positions ATF1 and ATF2 as shown by arrows b, b in FIG. 8 so that forces acting on the head A would be balanced and the head trace would then be stabilized at this balanced state. In this state, however, a mistracking occurs since the head A mainly reproduces recorded signals from the B track in about the center of the track length.

For preventing occurrence of such state, distinction between the odd frame and the even frame is provided as shown in FIG. 6, each frame consisting of 2 tracks. In the odd frame, the synchronizing signal f2 or f3 has a length of one block whereas in the even frame it has a length of 0.5 block. The LSB (least significant bit) of the block address (FIG. 5) of each block in the PCM region is determined to be "1" in the odd block and "0" in the even block. Indication of the odd frame and even frame is issued at each single rotation of the rotary head which is equivalent to one frame. If the distinction of the odd frame and even frame detected by the length of the synchronizing signal f2 or f3 or the block address coincides with this indication, a tracking error is detected by utilizing this synchronizing signal f2 or f3 whereas if the distinction does not coincide with the indication, the synchronizing signal f2 or f3 is discarded so that a tracking error is not detected.

More specifically, in FIG. 7, an odd/even detection circuit 11 detects the length of the synchronizing signal f2 or f3, judging that the frame is the odd frame if the length of the synchronizing signal is one block and it is the even frame if the length thereof is 0.5 block. As the rotary head is rotated, a PG (phase generator) generates one shot of pulse during a period of time between the end of reproduction by the head B (more exactly the end of the region of ATF2) and the start of reproduction by the head A (more exactly the start of the region of ATF1). This pulse is applied to a flip-flop circuit 13 to set or reset this circuit 13 steadily during each rotation of the rotation head. The Q output "1" or "0" of the flip-flop circuit 13 designates the odd number or even number of the frame. A comparison circuit 15 controls the logic circuit 24 in such a manner that the logic circuit 24 produces a sample hold signal SP2 when the designation of the odd number or even number by the flip-flop circuit 13 coincides with the odd number or even number detected by the odd/even detection circuit 11 whereas the logic circuit 24 does not produce the sample hold signal SP2 when these designation and detection do not coincide with each other. Further, if the sample hold signal SP2 is not produced for a predetermined period of time after the above described control by the comparison circuit 15, a switch 17 is switched to the b side to shift the tracking compulsorily to a position at which the sample hold signal SP2 is produced. Accordingly, if the head trace becomes the state shown by II in FIG. 8, the detection of the odd number and even number becomes opposite at the ATF1 region and ATF2 region while the designation of the odd number and even number remains unchanged between the ATF1 region and ATF2 region so that the detection of the odd number and even number becomes different from the designation either in the ATF1 region or ATF2 region. Accordingly, a tracking error in either the ATF1 region or ATF2 region in which the designation and detection coincide with each other is employed with a result that the tracking is corrected so as to cause the head A to trace the A track in only the ATF region in which the designation and detection coincide with each other. As a result of this tracking, the ATF synchronizing signal of the A track becomes reproducible after all in the ATF region in which the designation and detection do not coincide with each other so that the designation comes to coincide with the detection and the tracking thereby comes to be performed by the two tracking error signals.

Figure 8:
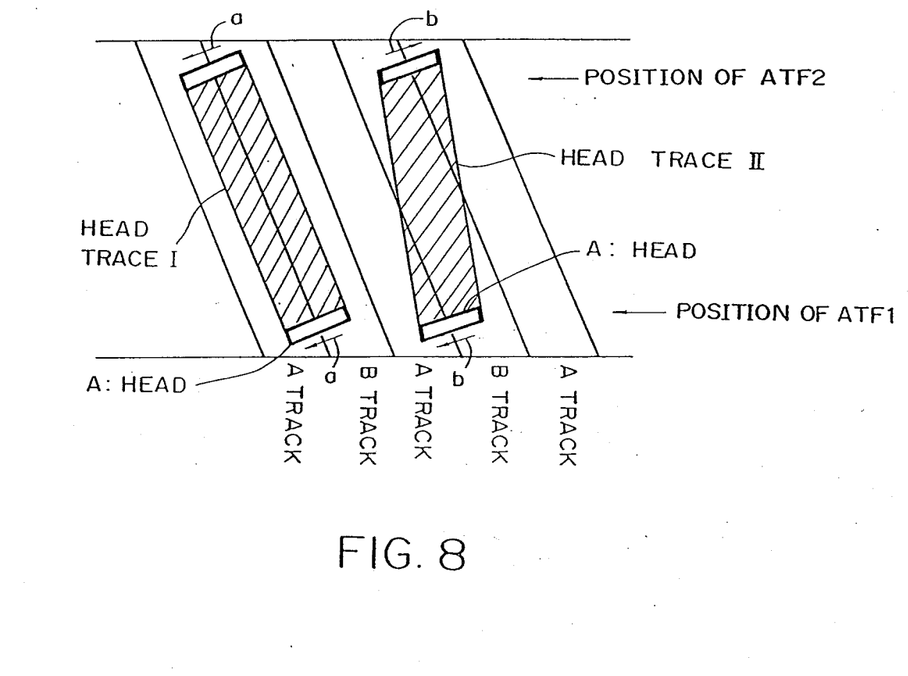
FIG. 8 is a view showing the tracing by a head on a track.

In the prior art device in which frames are divided into odd number frames and even number frames and either frame is designated, there arises a case in which, despite the fact that the head A is tracing the A track and the head B is tracing the B track as shown by state I in FIG. 8 so that reproduction is possible, neither the tracking error signal ATF1 nor ATF2 is employed for a period of time when the tracking is shifted to compulsorily cause the designation of the odd number or even number to coincide with the detection thereof in case they do not coincide with each other with a result that the tracking is not subjected to tracking servo control for a relatively long period of time in a state where, for example, the operation mode is changed from a stop mode or pause mode to a play mode or in a portion of junction of recording in which the alternate continuity of the odd and even number frames does not exist.

It is, therefore, an object of the invention to provide a magnetic recording and reproducing device which has eliminated the above described problem of the prior art magnetic recording and reproducing device and has realized saving of time required for subjecting the tracking of the heads to tracking servo control.

SUMMARY OF THE INVENTION

For achieving the above described object of the invention, it is a feature of the invention to invert a designated form of a synchronizing signal to be detected each time a head has scanned two tracks and, if this designation and the form of the synchronizing signal coincides with each other, detect a tracking error and implement a tracking control whereas, if this designation and the form of the synchronizing signal do not coincide with each other, change the designation without implementing the tracking control.

The magnetic recording and reproducing device achieving the above described object of the invention comprises a rotary head incorporating a plurality of heads of different azimuths for recording and reproducing an input signal by tracing a magnetic recording medium, these heads also reproducing signals recorded on left and right adjacent tracks simultaneously, and data recorded on the magnetic recording medium including the input signal, a synchronizing signal used for timing control of recording and reproducing of the input signal and a pilot signal of a predetermined frequency used for tracking control, the form of the synchronizing signal being different alternately in a series of tracks of the same azimuth; and tracking control means comprising tracking error signal generation means for generating, based on the timing of the synchronizing signal, a tracking error signal by detecting crosstalk components of the pilot signals on left and right adjacent tracks and comparing these components with each other, relative speed control means for controlling, responsive to the tracking error signal, a relative speed of the magnetic recording medium with respect to the heads of the rotary head, synchronizing signal form detection means for detecting the form of the synchronizing signal which has been reproduced by the heads, synchronizing signal form designation means for producing a signal which is inverted each time the rotary head has scanned two tracks of the magnetic recording medium and designating the form of the synchronizing signal with this signal, and synchronizing signal form coincidence/non-coincidence detection means for detecting coincidence or non-coincidence in the form of the synchronizing signal on the basis of the detection by the synchronizing signal form detection means and the designation by the synchronizing signal form designation means, the tracking control being controlled in accordance with result of detection of coincidence or non-coincidence in the form in such a manner that the tracking control is enabled during coincidence and he tracking control is disabled and the designation signal of the synchronizing signal form designation means is inverted during non-coincidence.

According to the invention, if the designated form of the synchronizing signal and the detected form of the synchronizing signal do not coincide with each other, the designation is changed so that the designated form and the detected form are immediately brought into coincidence whereby the tracking can be immediately subjected to tracking servo.

A preferred embodiment of the invention will now be described with reference to the accompanying drawings.

BRIEF DESCRIPTION OF THE DRAWINGS

In the accompanying drawings.

DESCRIPTION OF PREFERRED EMBODIMENT

Figure 1A:
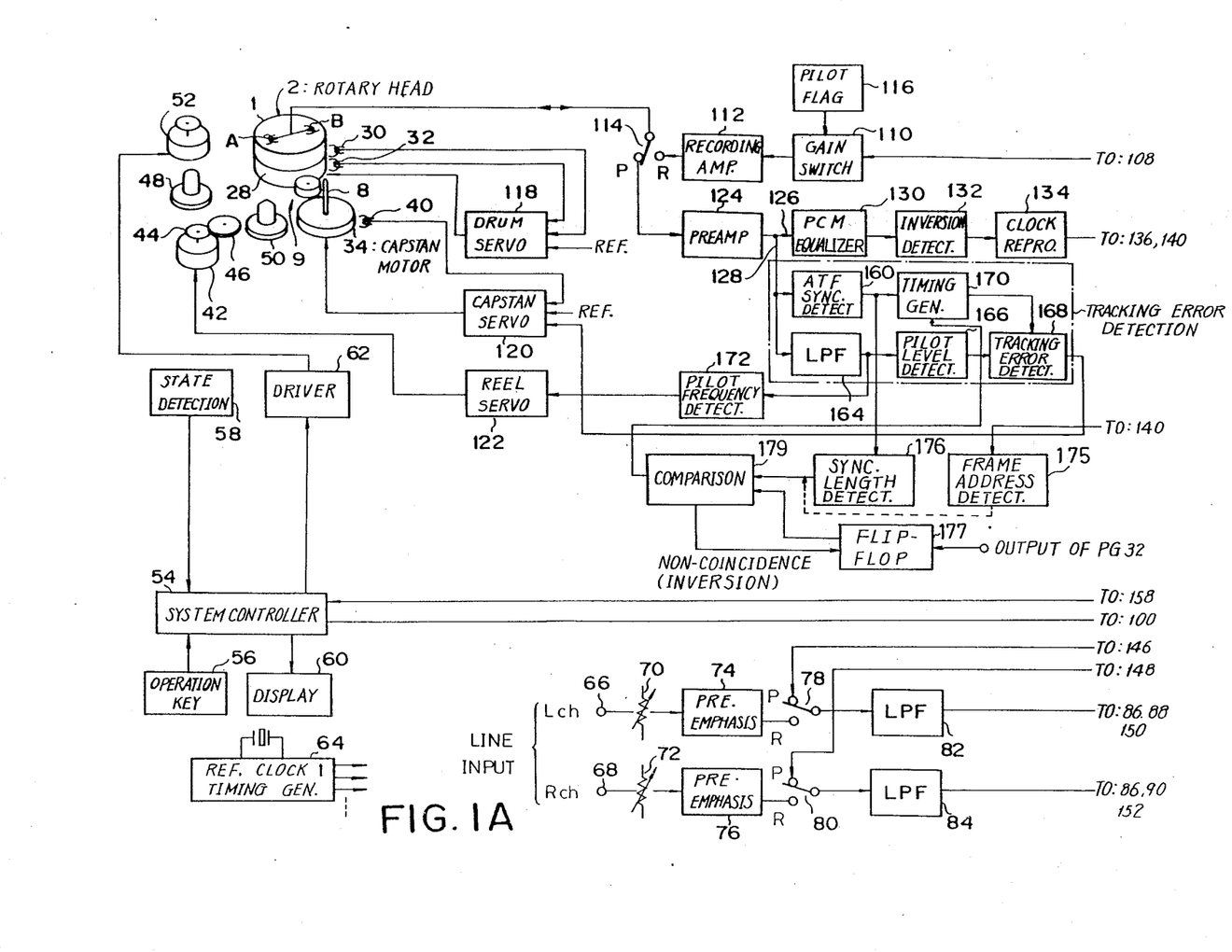
FIGS. 1A and 1B are block diagrams showing an embodiment in which this invention is applied to an R-DAT.
Figure 1B:
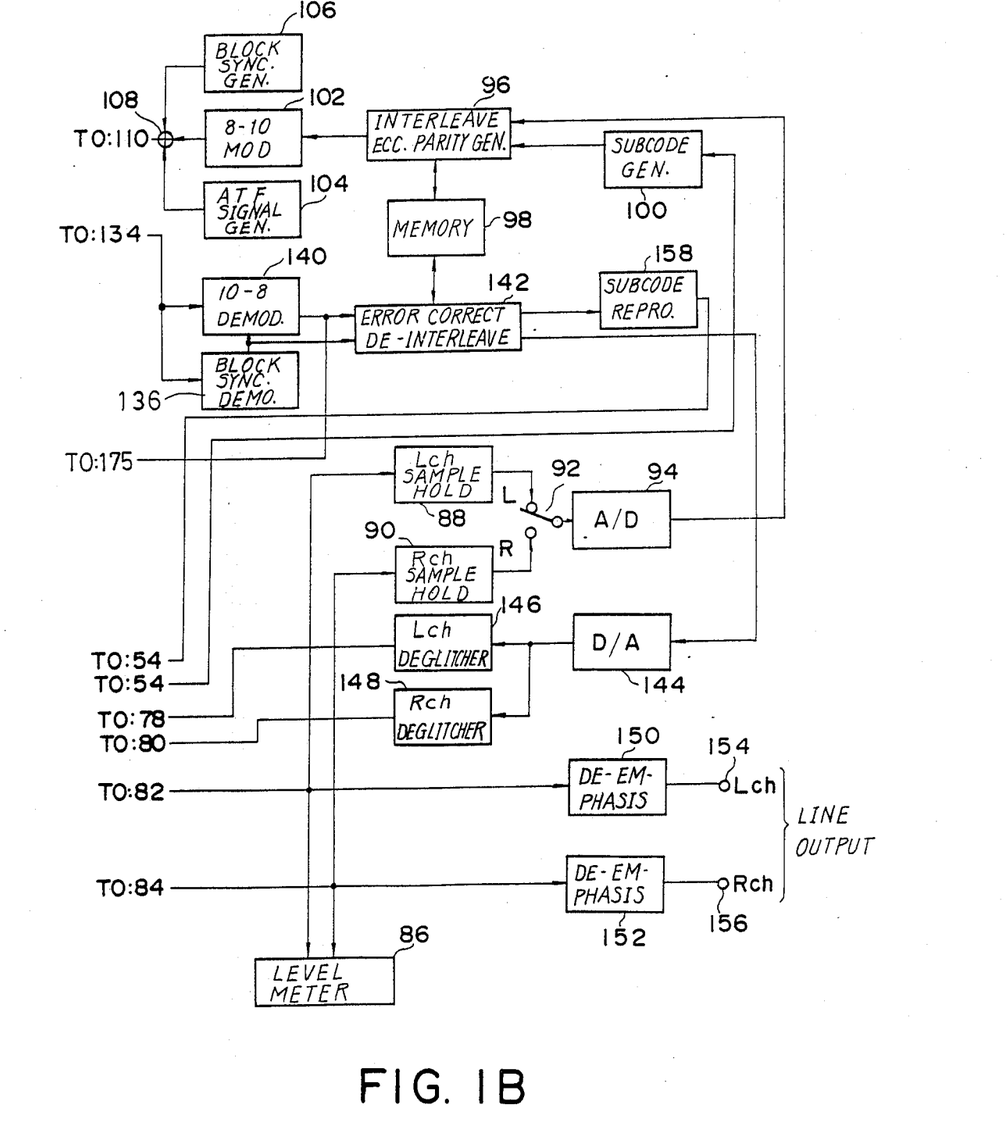

FIGS. 1A and 1B show an embodiment in which this invention is applied to an R-DAT.

A system controller 54 comprises a microcomputer and controls operations at each section in accordance with contents of commands issued by a keyboard 56 or detection section 58 inside the system, displaying necessary items such as music number and time on a display 60.

A reference clock /timing generation circuit 64 generates various reference clocks and timing signals to be used in the signal processing system or servo processing system by quartz oscillation outputs.

A rotary head 2 has two magnetic heads A and B arranged on the circumferential surface of a cylinder 1 at an interval of 180 degrees. The head 2 is driven by a drum motor 28. The head 2 is further provided with an FG (frequency generator) 30 for speed detection and a PG (phase generator) 32 for reference rotational position detection.

A capstan motor 34 comprises a motor shaft comprising a capstan 8, and a pinch roller 9 abuts on the capstan 8 to control and run the tape. An FG 40 is provided on the capstan motor 34 for speed detection.

A reel motor 42 drives reel tables 48 and 50 via pulleys 44 and 46 to wind the tape. A loading motor 52 loads casettes and tapes, and is actuated by a command from the system controller 54 by a driver 62.

Description will now be made as to the operation of the sections used for recording.

Analog audio signals of right and left channels are applied from input terminals 66 and 68. These signals are adjusted in recording level by attenuaters 70 and 72, pre-emphasized by pre-emphasis circuits 74 and 76 and supplied to switches 78 and 80.

The switches 78 and 80 are connected to the "R" side at the time of recording and supplies input analog signals to low-pass filters 82 and 84. The low-pass filters 82 and 84 are provided in order to attenuate unnecessary high frequency components in input signals and prevent aliasing due tq sampling. They have cut-off frequency which is ca. one half of the sampling frequency. The low-pass filters 82 and 84 function as demodulating filters in the reproduction mode. A level meter 86 displays recording level and reproducing level.

The output analog signals from the low-pass filters 82 and 84 are applied to sample hold circuits 88 and 90 to be sampled therein with a predetermined sampling frequency (48 kHz at R-DAT mode I).

The data from both channels are provided on a time shared basis by switching a switch 92 alternately, and converted into digital data (data of 16 bits for one channel) which forms the PCM data by an analog-to-digital converter 94.

The PCM data is divided into the upper order 8 bits and lower order 8 bits, and applied to an interleave/ECC parity generation circuit 96 for interleaving (rearrangement of data), parity generation (additon of error correction codes), addition of ID codes (identification codes), etc. via a memory 98. Sub-codes are prepared by a sub-code generation circuit 100 based on the data on the music number or time which are provided by the system controller 54.

The PCM data is applied to an 8–10 conversion circuit 102 which converts 8-bit data into 10-bit data respectively in a certain manner (i.e., in such a manner that the band is narrowed by restricting the interval of reversing magnetization and make DC current component zero).

A block synchronizing signal generation circuit 106 generates block synchrozing signals (refer to FIG. 5) which are placed at the beginning of a block respectively, a block being a basic unit of a track format. An ATF signal generation circuit 104 generates pilot signal f1, synchronizing signals f2 and f3, etc. which form respective patterns of ATF1 and ATF2. These signals are combined by a synthesizing circuit 108 in a suitable manner for the track format in FIG. 4. In this manner, a series of data which are to be recorded on a track are prepared.

These prepared series of data are applied to a switch 114 via a gain switch circuit 110 and a recording amplifier 112. The gain switch circuit 110 lowers the gain in accordance with a pilot flag from a circuit 116, which is raised during the period while the pilot signal f1 or ATF signal is being produced. Since the frequency of the pilot signal is low, if it is recorded with the same gain as other signals (or with the same recording current), this period alone is recorded excessively not to be easily erased when "over-write" occurs. The gain is therefore reduced to prevent such inconvenience during the period of the pilot signals to lower the recording current. The recording amplifier 112 amplifies the data to the level necessary to record it on the tape with the head 2. The switch 114 is connected to the "R" side at the recording, and feeds the output from the amplifier 112 to the heads A and B of the rotary head 2 to record the series of data on the tape.

A drum servo circuit 118 compares the rotation detection signals produced by FG 30 and PG 32 with the reference clock produced by the reference clock/timing generation circuit 64 in frequency and phase in the recording mode to control the rotation of the drum motor 28 through PLL control. The drum servo circuit 118 controls the rotation phase of the rotary head 2 for setting the detection timing of the data fed to the heads A and B and that of the reference position detected by PG 32 at a predetermined timing so that the data for one track supplied from the amplifier 112 may be correctly recorded on one track on a tape as shown in FIG. 3.

The capstan servo circuit 120 controls the capstan motor 34 in PLL control to set the tape speed at a predetermined rate (8.15 mm/sec) by comparing the output from FG 40 with the reference clock in frequency and phase.

A reel servo 122 drives a reel motor 42 to optimally suspend the tape without sagging.

Description will now be given to the sections which are operated for reproduction.

All the switches 78, 80, 92 and 114 are connected to the "P" side in the reproduction mode. The signals recorded on the tape are read by the heads A and B and applied to a preamplifier 124 via the switch 114. The output from the pre-amplifier 124 is fed to a PCM path 126 for reproducing PCM data and a controller path 128 for tracking control respectively.

The data fed in the PCM path 126 is compensated with respect to the frequency and phase characteristics of the heads A and B at a PCM equalizer 130 to open an eye pattern. The output from the PCM equalizer 130 is shaped in waveform into the digital signals of "1" and "0" by an inversion detecting circuit 132. Clock signal is also reproduced in a clock reproducing circuit 134.

The digital data which has been waveform-shaped is applied to a block synchronizing signal demodulation circuit 136 to be demodulated for identifying the beginning position of the data. It is also demodulated into the original data of the upper order 8 bits and the lower order 8 bits by a 10–8 demodulation circuit 140.

An error correction/de-interleave circuit 142 rearranges the reproduced data into the original pattern and corrects errors via a memory 98.

The corrected data now has 16 bits as the lower and upper 8 bits are combined. They are converted again to analog signals by a digital-to-analog converter 144. The analog signals are separated into the right and left channels and removed of unnecessary components by deglitchers 146, 148. It is demodulated into the original audio signals by low-pass filters 82 and 84 via the switches 78 and 80, de-emphasized by de-emphasize circuits 150 and 152, and guided to output terminals 154 and 156 respectively.

The sub-codes reproduced at a sub-code reproduction circuit 158 are fed to the system controller 54 to be used for display the musical number or time on the display 60 or for searching.

By the operation of the drum servo circuit 118, the rotary head 2 is rotated at a predetermined rate in response to the reference clock in a manner similar to the recording mode.

The reproduced signals supplied to the control path 128 are applied to an ATF synchronizing signal detection circuit 160 to detect synchronizing signals f2 and f3 in the ATF signals. A low-pass filter 164 extracts the crosstalk components of the pilot signal f1 from the adjacent tracks within the ATF signal. A pilot level detection circuit 166 detects the level of the crosstalk components, and a tracking error detection circuit 168 calculates the difference between the levels of the corsstalk components with the timing signal generated from a timing generation circuit 170 based on the synchronizing signals f2 and f3 to detect tracking errors. In the reproduction mode, the capstan servo circuit 120 controls the revolution rate of the capstan motor 34 so as to reduce the tracking errors to zero.

A synchronizing signal length detection circuit 176 detects length of the ATF synchronizing signals f2 and f3 once per frame at ATF1 period or ATF2 period to detect whether the frame is the odd number frame or even number frame. The detection of the odd number or even number of the frame may also be made by detecting the frame address in reproduced data by a frame address detection circuit 175. The detection of the frame address is made by a frame address in the vicinity of a certain fixed point on the track or a frame address which has been first obtained or finally obtained on the track (judged by a plurality of data in the vicinity of the frame address to be subjected to the detection for the accuracy of reading). A flip-flop circuit 177 receives a pulse from the PG 32 attached to the rotary head 2 once per rotation (i.e., one frame) of the rotary head 2 during a period of time from the end of reproduction by the head B (more exactly from the end of the ATF2 region) till the start of reproduction by the head A (more exactly till the start of the ATF1 region) and thereby is steadily set and reset by this pulse. The Q output "1" or "0" of the flip-flop circuit 177 designates the odd number or even number of the frame respectively. A comparison circuit 179 compares the designation of the odd number or even number by the flip-flop circuit 177 with the odd number or even number detected by the synchronizing signal length detection circuit 176 or the frame address detection circuit 175 and, when they coincide with each other, controls so that a newest tracking error signal is supplied to the capstan servo circuit 120. When the designation and detection do not coincide with each other, the comparison circuit 179 controls so that a preceding value as the tracking error signal is held and this preceding value is supplied to the capstan servo circuit 120 and also causes the flip-flop circuit 177 to be inverted. This inverting operation is performed during a period of time from the end of reproduction of the head B (more exactly from the end of the ATF2 region) till the start of reproduction of the head A (more exactly till the start of the ATF1 region) or during a period of time from the end of reproduction of the head A till the start of reproduction of the head B or during both these two periods of time (i.e., in a section or sections excepting a section in which the head A or B is tracing the section from ATF1 to ATF2). In case the state II of FIG. 8 was brought about, the designation of the odd number or even number and the detection thereof would coincide in either ATF1 or ATF2 and would not coincide in the other. The inversion between ATF1 and ATF2 however causes coincidence of the designation and detection or non-coincidence thereof in both ATF1 and ATF2 with resulting failure in detection of the state II. For preventing such inconvenience, the above described inversion operation in the section or sections excepting the section in which the head A or B is tracing from ATF1 to ATF2 is performed. If the odd number or even number is not detected, such state is deemed to be a normal state and the flip-flop 177 is inverted in the normal manner, i.e., at each frame by the output of the PG 32.

Figure 9:
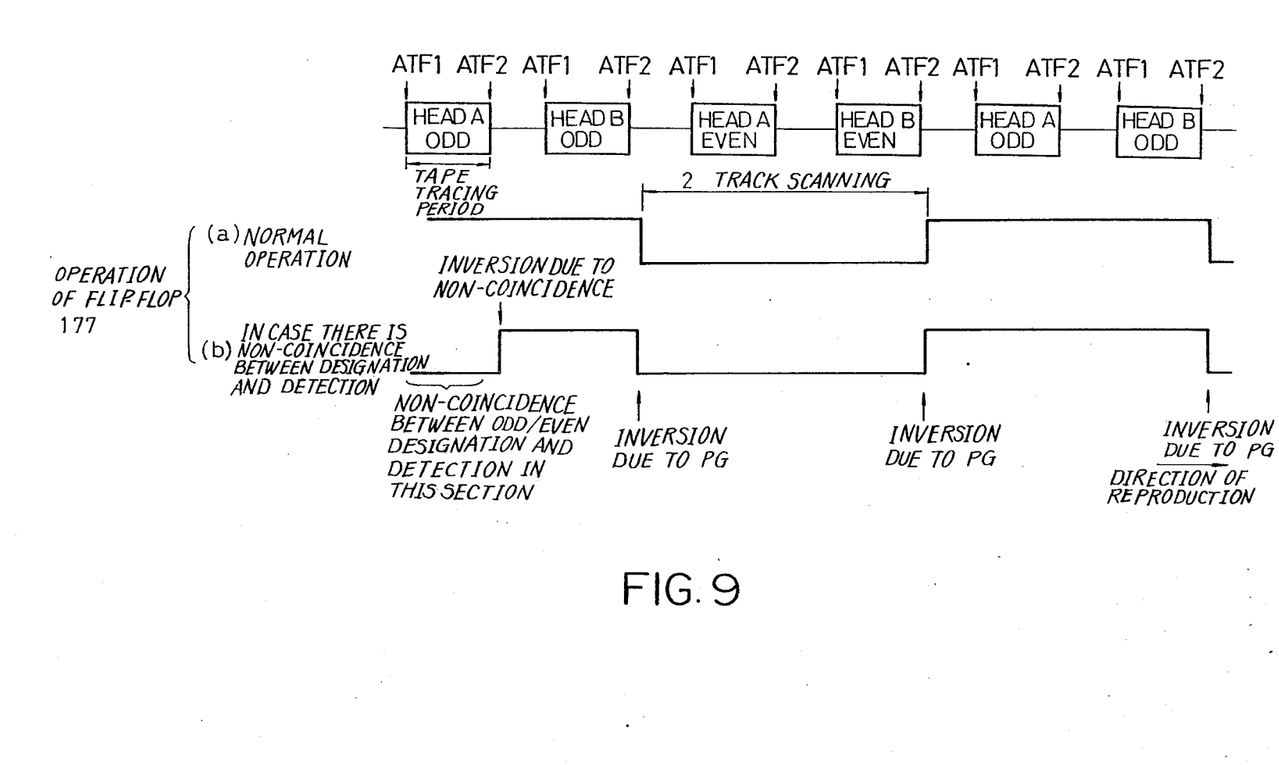
FIG. 9 is a diagram showing operation of a flip-flop circuit 177 in FIG. 1A.

According to this arrangement, as shown by (a) in FIG. 9, during the normal time when the designation of the odd number or even number coincides with the detection thereof, the flip-flop circuit 177 is inverted to provide designation of the odd number or even number at each one frame scanning by the output of the PG 32. If the designation of the odd number or even number has ceased to coincide with the detection thereof as shown in (b) of FIG. 9, the flip-flop circuit 177 is inverted after ending of the ATF2 region whereby the designation of the odd number or even number is immediately caused to coincide with the detection thereof.

Accordingly, even in a case where, as shown by the state I in FIG. 8, the head is correctly tracing the track but the designation of the odd number or even number of the frame does not coincide with the detection thereof, the designation and the detection are immediately brought into coincidence with each other by the inversion of the designation from the flip-flop circuit 177 whereby the tracking is immediately subjected to tracking servo. In the event when non-coincidence between the designation and detection occurs during starting of the device or in an uncontinuous portion in the recording, the designation and detection can be immediately brought into coincidence also by the above described operation.

In FIG. 1A, a pilot frequency detection circuit 172 is a circuit for searching which detects a pilot signal f1 among the ATF signals. When searching, it is necessary to occasionally read music number or time data out of the recorded content on the tape in order to "fast forward" or "rewind" the tape at a target position. For the purpose, the relative speed between the heads A and B and the tape should be restricted to a value substantially the same as that of recording. Pilot signal f1 is used for controlling the speed. In other words, as the pilot signal f1 is recorded in 130.67 kHz, it controls the reel servo circuit 122 to set the pilot signal f1 detected in the search at the frequency. This enables reading of music number and time data in subcodes and feeding of the tape to the target position correctly.

In the above described embodiment, the flip-flop circuit 177 is inverted by non-coincidence between the designated value and the detected value. Alternatively, the designation of the flip-flop circuit 177 may be changed by automatically performing setting and resetting on the basis of information representing the odd number or even number of the detected value. In this case, when the designated value coincides with the detected value, the same contents are doubly set and the designated value remains unchanged whereas when there occurs non-coincidence, the designated value is changed to coincide with the detected value.

Although the foregoing description has been made with respect to a case where this invention has been applied to the R-DAT, the invention is applicable also to VTR and other various magnetic recording and reproducing devices which can record and reproduce signals with a rotary head with plural heads and which can automatically control tracking by detecting, based on a timing of a synchronizing signal on a track, crosstalk components of pilot signals from adjacent tracks and comparing them to produce a tracking error signal.

What is claimed is:

1. A magnetic recording and reproducing device comprising:
   a rotary head incorporating a plurality of heads of different azimuths for recording and reproducing an input signal by tracing tracks of a magnetic recording medium, said heads also reproducing signals recorded on left and right adjacent tracks simultaneously with reproduction from a desired track, and data recorded on each track of said magnetic recording medium including the input signal, a synchronizing signal used for timing control of recording and reproducing of said input signal and a pilot signal of a predetermined frequency used for tracking control, the synchronizing signal having a form which is different alternately in a series of a tracks of the same azimuth; and
   tracking control means comprising:
   tracking error signal generation means for generating, based on timing of said synchronizing signal, a tracking error signal by detecting crosstalk components of the pilot signals on left and right adjacent racks and comparing these components with each other;
   relative speed control means for controlling, responsive to the tracking error signal, a relative speed of said magnetic recording medium with respect to said heads of said rotary head;
   synchronizing signal form detection means of detecting the form of the synchronizing signal which has been reproduced by said heads;
   synchronizing signal form designation means for producing a signal which is inverted each time said rotary head has scanned two tracks of said magnetic recording medium and designating the form of the synchronizing signal with this signal; and
   synchronizing signal form coincidence/non-coincidence detecting means for detecting coincidence or non-coincidence in the form of the synchronizing signal on the basis of the detection by said synchronizing signal form detecting means and the designation by said synchronizing signal form designation means and for causing the tracking control to be controlled in accordance with result of detection of coincidence or non-coincidence in the form in such a manner that the tracking control is applied during coincidence and the tracking control is not applied and the designation signal of said synchronizing signal form designation means is inverted during non-coincidence.

2. A magnetic recording and reproducing device as defined in claim 1 wherein the period of time of the synchronizing signal is different between an odd frame and an even frame.

3. A magnetic recording and reproducing device as defined in claim 2 wherein said synchronizing signal form detection means detects length of the period of time of the synchronizing signal.

4. A magnetic recording and reproducing device as defined in claim 2 wherein the inversion of the designation signal of said synchronizing signal form designation means based on the detection of non-coincidence in the form of the synchronizing signal is made within a period of time during which scanning of said magnetic recording medium by said heads of said rotary head is switched from one head to another.

5. A magnetic recording and reproducing device as defined in claim 2 wherein, when said synchronizing signal form detection means has not detected the form of the synchronizing signal, said synchronizing signal form detection means is deemed to have detected coincidence in the form of the synchronizing signal.

6. A magnetic recording and reproducing device as defined in claim 2 wherein said synchronizing signal form designation means comprises a flip-flop and designates the form of the synchronizing signal by output of this flip-flop, the output of said flip-flop being inverted when non-coincidence in the form of the synchronizing signal has been detected.

7. A magnetic recording and reproducing device as defined in claim 1 wherein said synchronizing signal form detection means detects the form of the synchronizing signal on the basis of reproduced data of an input signal recorded on said magnetic recording medium.

8. A magnetic recording and reproducing device as defined in claim 7 wherein said synchronizing signal form designation means comprises a flip-flop and designates the form of the synchronizing signal by the output of this flip-flop, said flip-flop being set or reset in accordance with result of detection by said synchronizing signal form detection means.

* * * * *